United States Patent
Sawado

(10) Patent No.: US 8,004,642 B2
(45) Date of Patent: Aug. 23, 2011

(54) LIQUID CRYSTAL DISPLAY DEVICE COMPRISING TRANSITION ELECTRODES HAVING A SAME POTENTIAL AS A CORRESPONDING ONE OF THE SCANNING LINES

(75) Inventor: Ayae Sawado, Kai (JP)

(73) Assignee: Seiko Epson Corporation, Tokyo (JP)

( * ) Notice: Subject to any disclaimer, the term of this patent is extended or adjusted under 35 U.S.C. 154(b) by 773 days.

(21) Appl. No.: 12/027,416

(22) Filed: Feb. 7, 2008

(65) Prior Publication Data
US 2008/0212006 A1    Sep. 4, 2008

(30) Foreign Application Priority Data
Mar. 1, 2007  (JP) ................... 2007-051263

(51) Int. Cl.
*G02F 1/1343*    (2006.01)
(52) U.S. Cl. ........................ 349/139
(58) Field of Classification Search ............ 349/139
See application file for complete search history.

(56) References Cited

U.S. PATENT DOCUMENTS

| | | | | |
|---|---|---|---|---|
| 6,661,491 B2* | 12/2003 | Yamakita et al. | ............ | 349/139 |
| 6,873,377 B2* | 3/2005 | Konno et al. | ............ | 349/33 |
| 7,088,402 B2* | 8/2006 | Ochiai et al. | ............ | 349/39 |
| 7,518,695 B2* | 4/2009 | Cho et al. | ............ | 349/155 |
| 2004/0114059 A1* | 6/2004 | Lee et al. | ............ | 349/39 |
| 2005/0012871 A1* | 1/2005 | Chang | ............ | 349/38 |

FOREIGN PATENT DOCUMENTS

| | | |
|---|---|---|
| JP | A-2001-296519 | 10/2001 |
| JP | A-2002-328399 | 11/2002 |

\* cited by examiner

*Primary Examiner* — Mark Robinson
*Assistant Examiner* — Charles Chang
(74) *Attorney, Agent, or Firm* — Oliff & Berridge, PLC

(57) ABSTRACT

A liquid crystal device includes a first substrate; a second substrate facing the first substrate; and a liquid crystal layer sandwiched between the first substrate and the second substrate. A display operation is performed by changing an alignment state of the liquid crystal layer from a splay alignment to a bend alignment. The first substrate includes a plurality of scanning lines, a plurality of data lines intersecting the plurality of scanning lines, a plurality of pixel electrodes, and a plurality of transition electrodes generating a potential difference with respect to the pixel electrodes, the plurality of transition electrodes being formed closer to the liquid crystal layer than the scanning lines or the data lines and closer to the first substrate than the pixel electrodes.

11 Claims, 9 Drawing Sheets

(BEND ALIGNMENT)

(SPLAY ALIGNMENT)

LIQUID CRYSTAL DISPLAY DEVICE COMPRISING TRANSITION ELECTRODES HAVING A SAME POTENTIAL AS A CORRESPONDING ONE OF THE SCANNING LINES

BACKGROUND

1. Technical Field

The present invention relates to liquid crystal devices and electronic apparatuses.

2. Related Art

In the field of liquid crystal displays (LCDs) represented particularly by liquid crystal televisions (TVs) or the like, LCDs in the optically compensated bend (OCB) mode which have a high response speed have been in spotlights in recent years in order to improve the quality of moving images. In the OCB mode, liquid crystal in its initial state exhibits a splay alignment. In a display operation, the liquid crystal must be bent into a bow shape (bend alignment). That is, the high speed responsiveness is realized by modulating a transmission factor based on the degree of bend in the bend alignment in a display operation.

In the case of such an LCD in the OCB mode, the liquid crystal exhibits the splay alignment when power supply is cut off. Therefore, at the time the LCD is turned on, the so-called initial transition operation must be performed in which the alignment state of the liquid crystal is changed from the initial splay alignment to the bend alignment for a display operation by applying a voltage greater than or equal to a certain threshold voltage to the liquid crystal. JP-A-2001-296519 discloses the technique of promoting the initial alignment transition of liquid crystal using horizontal electric fields generated between the liquid crystal and pixel electrodes.

However, the technique described in JP-A-2001-296519 requires a high voltage in order to form transition nuclei at predetermined positions of the pixel electrodes. Therefore, a power supply of small capacity for use in an electronic apparatus such as a mobile apparatus has insufficient electric field intensities and cannot produce sufficient and equivalent transition nuclei. This results in display errors or failing to achieve desired high speed responsiveness.

SUMMARY

An advantage of some aspects of the invention is that it provides a liquid crystal display and an electronic apparatus capable of performing initial alignment transition in the OCE mode with low voltage in a short period of time.

According to an aspect of the invention, there is provided a liquid crystal device including a first substrate, a second substrate facing the first substrate, and a liquid crystal layer sandwiched between the first substrate and the second substrate. A display operation is performed after transition of the liquid crystal layer from a splay alignment state to a bend alignment state. The first substrate includes a plurality of scanning lines, a plurality of data lines intersecting the plurality of scanning lines, a plurality of pixel electrodes, and a plurality of transition electrodes generating a potential difference with respect to the pixel electrodes, the plurality of transition electrodes being formed closer to the liquid crystal layer than the scanning lines or the data lines and closer to the first substrate than the pixel electrodes.

According to the liquid crystal device of the aspect of the invention, transition nuclei serving as starting points for initial transition can be formed by generating an electric field between the pixel electrodes and the transition electrodes. Since the transition electrodes and the pixel electrodes overlap, the distance between the electrodes can be reduced, as compared with a conventional electrode structure using a horizontal electric field, by making the film thickness of an insulating layer (dielectric film) provided between the electrodes small. As a result, the initial transition can be performed using a low voltage in a short period of time.

It is preferable that an end of each of the pixel electrodes overlap a corresponding one of the transition electrodes. Accordingly, the transition nuclei serving as starting points for the foregoing initial transition can be successfully generated between the pixel electrodes and the transition electrodes. Further, liquid crystal molecules above the end of each pixel electrode can be aligned, thereby inducing the initial transition over a wide area of the pixel electrode.

It is preferable that a dielectric film be provided between each of the pixel electrodes and a corresponding one of the transition electrodes, and a portion of the dielectric film overlapping the corresponding one of the transition electrodes have a film thickness of less than or equal to 1 µm.

In general, because electrodes and wiring lines are formed by photolithography, the distance between the electrodes or the wring lines is set to approximately 2 µm due to the technical necessity. In contrast, according to the aspect of the invention, the film thickness of the dielectric film provided between each of pixel electrodes and a corresponding one of the transition electrodes is less than or equal to 1 µm. Thus, the electrodes can be formed closer to each other, and the initial transition can be induced using a lower voltage than that in a conventional horizontal electric field mode.

It is preferable that each of the pixel electrodes or each of the transition electrodes have a bent portion. Accordingly, electric fields are generated by the bent portion in various directions between each of the pixel electrodes and a corresponding one of the transition electrodes, thereby ensuring the generation of the transition nuclei due to the bent portion. Therefore, the evenness of the initial transition and the high speed responsiveness can be further enhanced.

It is preferable that each of the transition electrodes be formed so as to have an island shape. Accordingly, a transition electrode can be provided at a desired position in each pixel area, and positions at which transition nuclei serving as starting points for the initial alignment transition can be set to arbitrary positions.

It is preferable that a slit formed in each of the pixel electrodes overlaps a corresponding one of the transition electrodes. Accordingly, a transition electrode can be provided at a desired position in each pixel area, and positions at which transition nuclei serving as starting points for the initial alignment transition can be set to arbitrary positions.

It is preferable that a protruding part be provided at, in plan view, a position separated from each of the pixel electrodes and overlapping a corresponding one of the transition electrodes. Accordingly, the liquid crystal molecules can be initially tilted and aligned in various directions due to the protruding part. Further, diagonal electric fields in various directions can be generated by applying an initial transition voltage. This generates disclination near the protruding part, and the evenness of the initial transition and the high speed responsiveness can be further enhanced.

It is preferable that each of the transition electrodes has the same potential as a corresponding one of the scanning lines Accordingly, electric fields inducing starting points for the initial transition can be generated between each of the pixel electrodes and a corresponding one of the scanning lines by applying a voltage to each scanning line. By stacking the scanning lines and the transition electrodes on each other, they can be continuously formed. As a result, the manufacturing process can be simplified.

According to another aspect of the invention, there is provided an electronic apparatus including the foregoing liquid crystal device.

According to the electronic apparatus of the aspect of the invention, since the electronic apparatus has the liquid crystal device capable of performing the initial alignment transition in the OCB mode using low voltage in a short period of time, the electronic apparatus of high display quality can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1A:
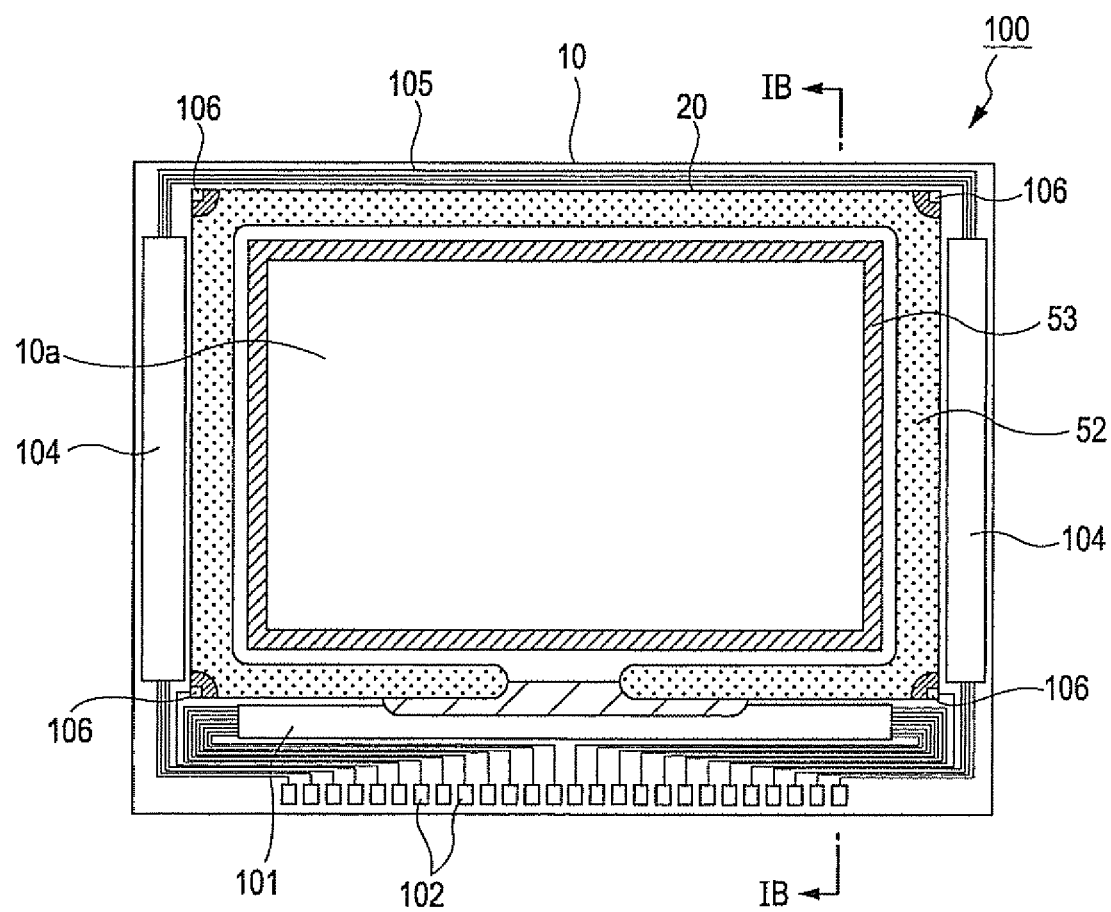
FIGS. 1A and 1B schematically illustrate the structure of a liquid crystal device according to a first embodiment.

Embodiments of the invention will be described with reference to the drawings. In the drawings used in the following description, individual components are shown in various suitable scales so that the components are easily recognizable. Further, in this specification, the minimum unit of displaying an image is referred to as a "sub-pixel area", and a set of multiple sub-pixel areas with respective color filters is referred to as a "pixel".

Figure 1B:
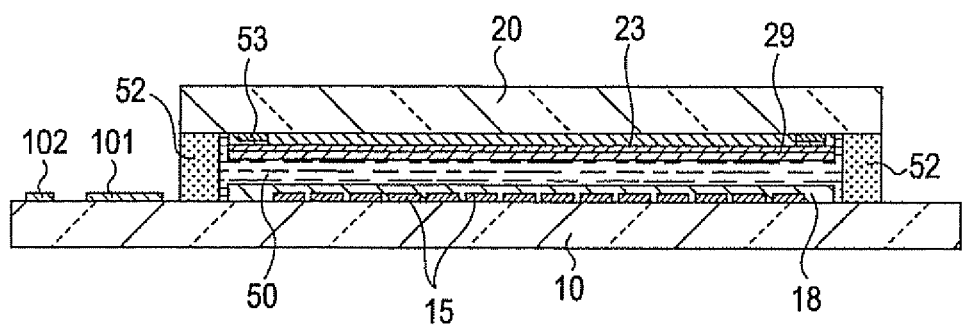
Figure 2:
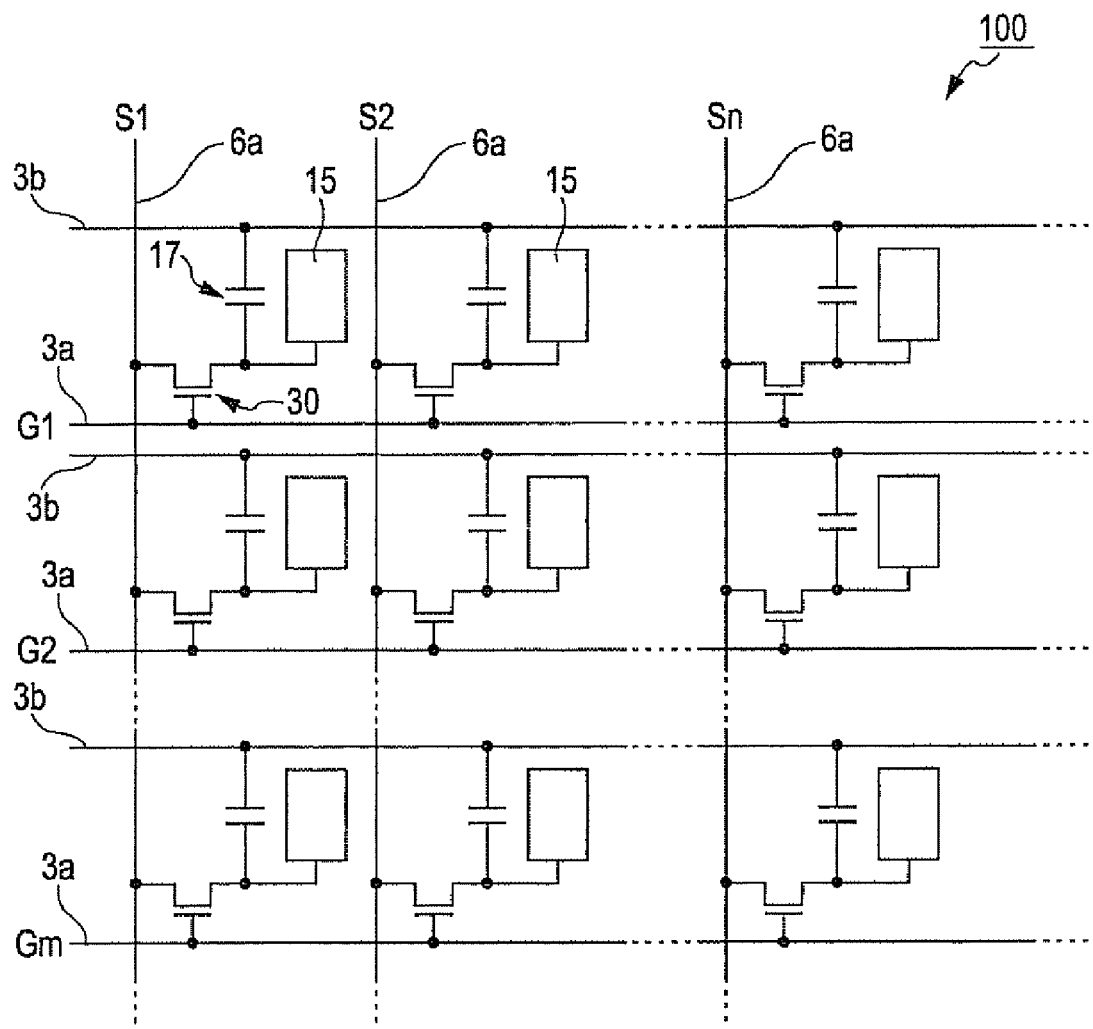
FIG. 2 is an equivalent circuit diagram of the liquid crystal device.
Figure 3:
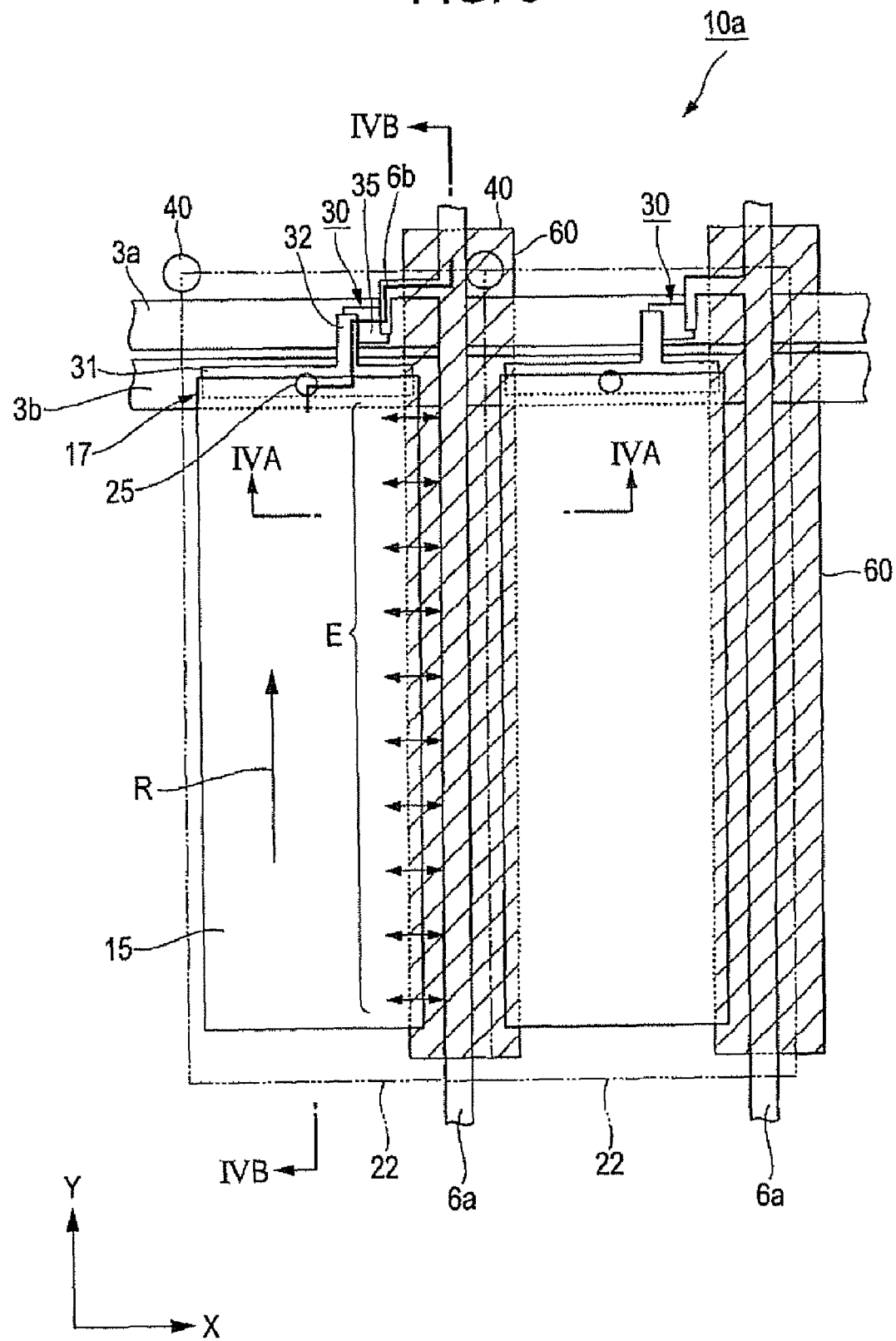
FIG. 3 is a plan view of the structure of a sub-pixel area.
Figure 4A:
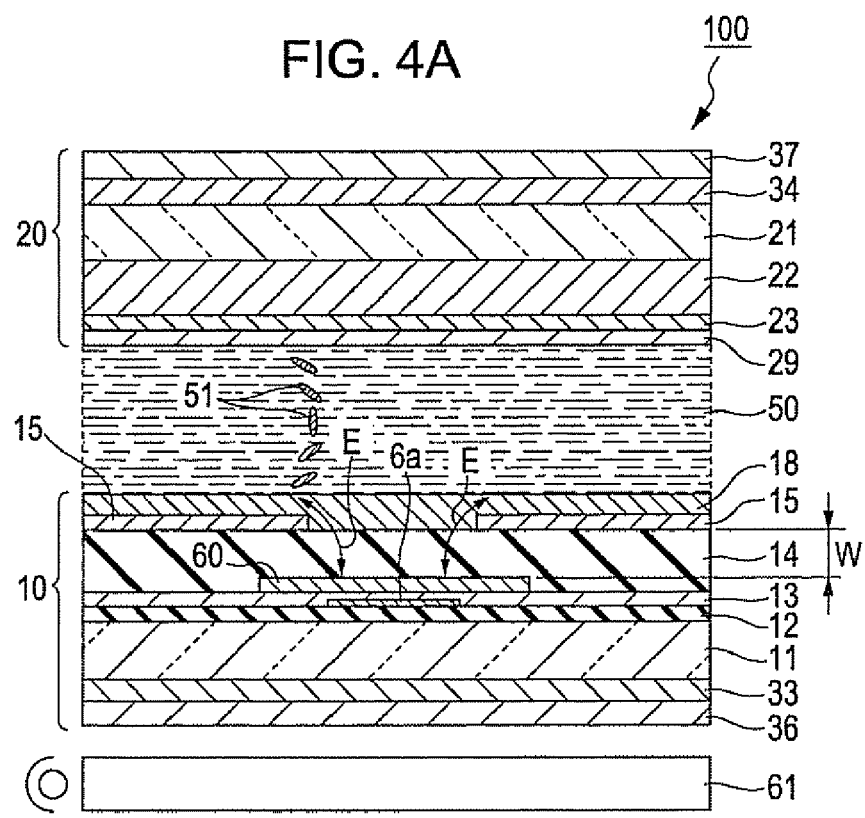
FIGS. 4A and 4B illustrate cross sections of the liquid crystal device.
Figure 4B:
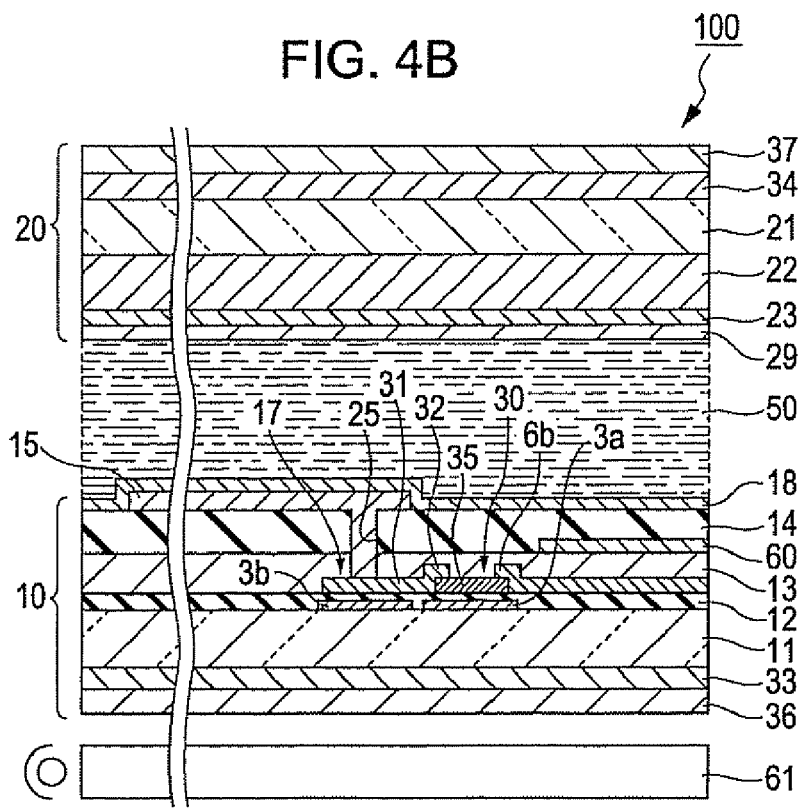
Figure 5A:
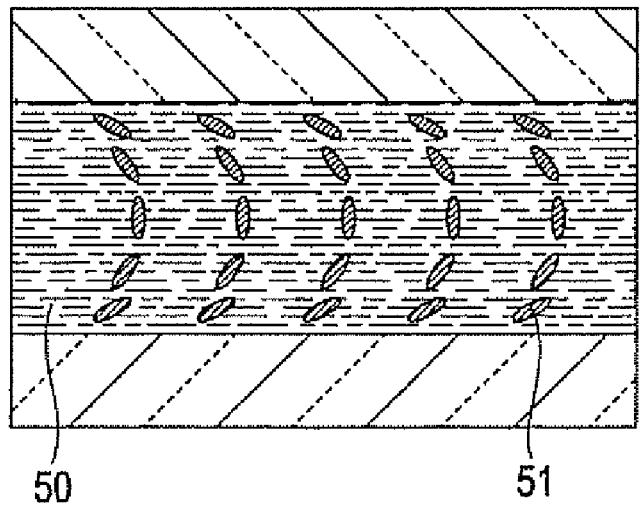
FIGS. 5A and 5B schematically illustrate the alignment state of liquid crystal molecules.
Figure 5B:
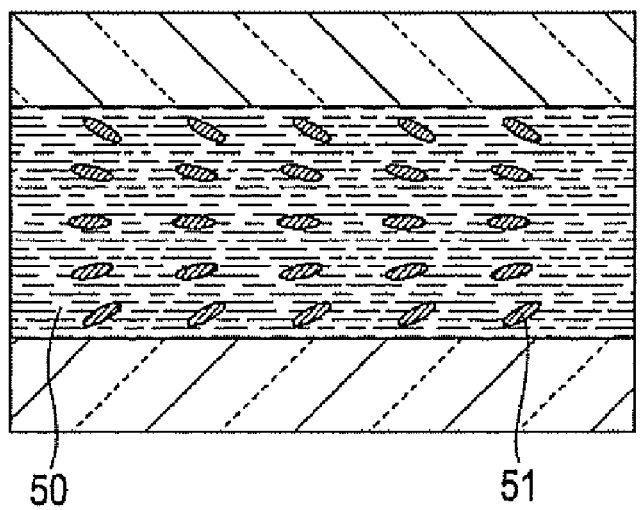

FIG. 1A is a plan view of a liquid crystal device according to a first embodiment, and FIG. 1B is a sectional view taken along the line IB-IB in FIG. 1A. FIG. 2 is an equivalent circuit diagram of the liquid crystal device. FIG. 3 is a plan view of the structure of a sub-pixel area. FIGS. 4A and 4B are sectional views of the liquid crystal device. FIG. 4A is a sectional view taken along the line IVA-IVA of FIG. 3. FIG. 4B is a sectional view taken along the line IVB-IVB of FIG. 3. FIGS. 5A and 5B schematically illustrate the alignment state of liquid crystal molecules.

The liquid crystal device according to the first embodiment is a thin-film-transistor (TFT) active-matrix-type liquid crystal device using TFTs as pixel switching elements.

A liquid crystal device 100 includes, as shown in FIG. 1, an element substrate (first substrate) 10, a counter substrate (second substrate) 20 disposed facing the element substrate 10, and a liquid crystal layer 50 sandwiched between the element substrate 10 and the counter substrate 20. The liquid crystal layer 50 is made of a liquid crystal material with a positive anisotropy of dielectric constant.

The liquid crystal device 100 bonds the element substrate 10 and the counter substrate 20 using a sealant 52. The liquid crystal layer 50 is sealed in areas defined by the sealant 52. A peripheral partition 53 is formed along the inner periphery of the sealant 52. A rectangular area enclosed by the peripheral partition 53 in plan view (when the element substrate 10 is viewed from the counter substrate 20) serves as an image display area 10a.

The liquid crystal device 100 includes a data-line drive circuit 101 and scanning-line drive circuits 104 provided outside the area enclosed by the sealant 52, connection terminals 102 connecting to the data-line drive circuit 101 and the scanning-line drive circuits 104, and wiring lines 105 interconnecting the scanning-line drive circuits 104.

In the image display area 10a of the liquid crystal device 100, as shown in FIG. 2, a plurality of sub-pixel areas are arranged in a matrix in plan view. In each of the sub-pixel areas, a pixel electrode 15 and a TFT 30 for performing switching control of the pixel electrode 15 are provided. In the image display area 10a, a plurality of data lines 6a and a plurality of scanning lines 3a are provided in a lattice pattern. That is, the sub-pixel areas correspond to areas defined by the data lines 6a and the scanning lines 3a.

The data lines 6a are electrically connected to sources of the TFTs 30. The scanning lines 3a are electrically connected to gates of the TFTs 30. Drains of the TFTs 30 are electrically connected to the pixel electrodes 15. The data lines 6a are connected to the data-line drive circuit 101 and supply image signals S1, S2, . . . , and Sn supplied from the data-line drive circuit 101 to the corresponding sub-pixel areas. The scanning lines 3a are connected to the scanning-line drive circuits 104 and supply scanning signals G1, G2, . . . , and Gm supplied from the scanning-line drive circuits 104 to the corresponding sub-pixel areas. The image signals S1 to Sn supplied from the data-line drive circuit 101 to the data lines 6a may be supplied in this order in a line sequential manner or may be supplied to a plurality of data lines 6a adjacent to one another on a group-by-group basis. The scanning-line drive circuits 104 supply the scanning signals G1 to Gm in terms of pulses to the scanning lines 3a in a line sequential manner at a predetermined timing.

In the liquid crystal device 100, the TFTs 30 serving as switching elements are turned on for a certain period of time in response to the inputting of the scanning signals G1 to Gm, thereby writing the image signals S1 to Sn supplied from the data lines 6a to the pixel electrodes 15 at a predetermined timing. The image signals S1 to Sn which have been written to liquid crystal via the pixel electrodes 15 and which have been at certain levels are retained for a certain period of time between the pixel electrodes 15 and a common electrode disposed facing the pixel electrodes 15 with the liquid crystal layer 50 provided therebetween, which will be described later.

In order to prevent the retained image signals S1 to Sn from leaking, storage capacitors 17 are connected in parallel to corresponding liquid crystal capacitors formed between the pixel electrodes 15 and the common electrode. Each of the storage capacitors 17 is provided between the drain of a corresponding one of the TFTs 30 and a corresponding one of capacitor lines 3b.

Next, the detailed structure of the liquid crystal device 100 will be described with reference to FIGS. 3, 4A and 4B. In FIG. 3, the long-side direction of the sub-pixel areas which are substantially rectangular in plan view, the long-side direction of the pixel electrodes 15, and the direction in which the data lines 6a extend are defined as the Y-axis direction; and the short-side direction of the sub-pixel areas, the short-side direction of the pixel electrodes 15, and the direction in which the scanning lines 3a and the capacitor lines 3b extend are defined as the X-axis direction.

The liquid crystal device 100 includes, as shown in FIGS. 4A and 4B, the element substrate 10 and the counter substrate 20 facing each other with the liquid crystal layer 50 provided therebetween; a retardation film 33 and a polarizing film 36 provided on an exterior side of the element substrate 10 (opposite to the liquid crystal layer 50); a retardation film 34 and a polarizing film 37 provided on an exterior side of the counter substrate 20 (opposite to the liquid crystal layer 50); and an illuminating unit 61 that is provided outside the polarizing film 36 and emits illumination light to the exterior side of the element substrate 10. The liquid crystal layer 50 is configured to operate in the OCB mode. In operation of the liquid crystal device 100, as shown in FIG. 5A, liquid crystal molecules 51 exhibit the bend alignment in which the liquid crystal molecules 51 are aligned substantially in the form of a bow.

As shown in FIG. 3, in each of the sub-pixel areas, the pixel electrode 15 having a rectangular shape in plan view is formed. Each data line 6a extends along, of the sides of the pixel electrode 15, long sides extending in the Y-axis direction. Each scanning line 3a extends along short sides (X-axis direction) of the pixel electrode 15. Each capacitor line 3b, which extends in parallel to the scanning line 3a, is formed beside the scanning line 3a facing the pixel electrode 15.

Above the scanning line 3a, the TFTs 30 serving as switching elements are formed. Each of the TFTs 30 includes a semiconductor layer 35 including an island-shaped amorphous silicon film, and a source electrode 6b, and a drain electrode 32 which are provided overlapping part of the semiconductor layer 35 in plan view. A portion of the scanning line 3a covering the same area as the semiconductor layer 35 in plan view functions as a gate electrode of the TFT 30.

The source electrode 6b, is connected at its end opposite to the semiconductor layer 35 to a corresponding one of the data lines 6a. The drain electrode 32 is connected at its end opposite to the semiconductor layer 35 to a corresponding one of capacitor electrodes 31 having a substantially rectangular shape in plan view. The capacitor electrode 31 is provided in a planar area of the capacitor line 3b and constitutes, together with the capacitor line 3b serving as an electrode, the storage capacitor 17. The pixel electrode 15 and the capacitor electrode 31 are electrically connected to each other via a pixel contact hole 25 formed in a planar area of the capacitor electrode 31, thereby establishing an electrical connection between the drain of the TFT 30 and the pixel electrode 15.

Further, as shown in FIG. 3, in plan view (viewed in a direction perpendicular to the pixel electrode 15), transition electrodes 60 having a stripe pattern are provided, covering the corresponding data lines 6a, between the pixel electrodes 15. Each of the transition electrodes 60 is provided, as shown in FIGS. 4A and 4B, above the scanning line 3a and the data line 6a and below the pixel electrode 15. The transition electrode 60 generates a potential difference with respect to the pixel electrode 15. By generating an electric field between the electrodes 60 and 15, starting points for the initial alignment transition from the splay alignment to the bend alignment are generated, which will be described in detail later.

In plan view (when the surface of the element substrate 10 is viewed in a direction perpendicular to the element substrate 10), at least part of an area in which the transition electrode 60 is formed (the contour of the transition electrode 60) is formed outside an area in which the pixel electrode 15 is formed (the contour of the pixel electrode 15).

More specifically, according to the first embodiment, an end of the pixel electrode 15 (facing the data line 6a) exists above the transition electrode 60 in plan view. That is, the transition electrode 60 and the end of the pixel electrode 15 overlap each other(see FIG. 3).

As shown in FIGS. 4A and 4B, the element substrate 10 includes a substrate main body 11 which is made of a light-transmissive material, such as glass, quartz, or plastic, and which serves as a main body. On an inner side of the substrate main body 11 (facing the liquid crystal layer 50), the scanning line 3a, the capacitor line 3b, a gate insulating film 12 covering the scanning line 3a and the capacitor line 3b, the semiconductor layer 35 facing the scanning line 3a with the gate insulating film 12 provided therebetween, the source electrode 6b, (data line 6a) connected to the semiconductor layer 35, the drain electrode 32, and the capacitor electrode 31 which is connected to the drain electrode 32 and which faces the capacitor line 3b with the gate insulating film 12 provided therebetween are formed. That is, the TFT 30 and the storage capacitor 17 connected to the TFT 30 are formed.

A planarizing film 13 that planarizes the unevenness of the substrate due to the TFT 30 and the like is formed covering the TFT 30. The transition electrode 60 is provided on the planarizing film 13. The transition electrode 60 is made of a transparent conductive material, such as indium tin oxide (ITO) or the like, as in the pixel electrode 15. Accordingly, liquid crystal molecules above the transition electrode 60 can contribute to a display operation, thereby preventing an aperture ratio from decreasing. A dielectric film 14 is provided covering the transition electrode 60. The dielectric film 14 is a transparent insulating film made of silicon oxide, silicon nitride, or the like. It is preferable that at least a portion of the dielectric film 14 covering the transition electrode 60 have a film thickness W of less than or equal to 1 μm.

In a horizontal electric field mode, it is generally necessary to form electrodes adjacent to one another. Because these electrodes are formed by photolithography, the distance between the electrodes is set to approximately 2 μm due to the technical necessity, such as the processing accuracy or the like. In contrast, according to the first embodiment, the film thickness of the dielectric film 14 provided between the pixel electrode 15 and the transition electrode 60 is less than or equal to 1 μm. Thus, the inter-electrode distance is reduced, as compared with that in the conventional horizontal electric field mode. As a result, the equivalent electric field can be generated by a lower voltage, and the initial transition can be induced using this electric field.

The pixel electrode 15 formed on the dielectric film 14 and the capacitor electrode 31 are electrically connected to each other via the pixel contact hole 25 which is formed through the planarizing film 13 and the dielectric film 14 and reaches the capacitor electrode 31. An alignment film 18 is formed covering the pixel electrode 15. The alignment film 18 is made of, for example, polyimide and is rubbed in the long-side direction of the sub-pixel areas (in the direction indicated by arrow R shown in FIG. 3).

The counter substrate 20 includes a substrate main body 21 which is made of a light-transmissive material, such as glass, quartz, or plastic, and which serves as a main body. On an inner side of the substrate main body 21 (facing the liquid crystal layer 50), a color filter 22 including a colorant layer of the color type corresponding to a corresponding one of the sub-pixel areas, a common electrode 23, and an alignment film 29 are formed staking on one another.

The common electrode 23 is made of a transparent conductive material, such as ITO or the like, and is formed as a solid electrode covering the plurality of sub-pixel areas.

The alignment film 29 is made of, for example, polyimide and is formed covering the common electrode 23. The surface of the alignment film 29 is rubbed in a direction parallel to the alignment direction R of the alignment film 18 (in the direction indicated by arrow R shown in FIG. 3).

Next, the initial transition operation of the liquid crystal device 100 in the OCB mode will be described with reference to the drawings. FIGS. 5A and 5B illustrate the alignment state of liquid crystal molecules in the OCB mode.

In the liquid crystal device in the OCB mode, the liquid crystal molecules 51 are aligned in splayed state (splay alignment), as shown in FIG. 5B, in the initial state (non-operating state). In a display operation, the liquid crystal molecules 51 are aligned in bent state (bend alignment), as shown in FIG. 5A. The liquid crystal device 100 realizes high speed response in the display operation by modulating a transmissivity based on the degree of bend in the bend alignment in the display operation.

In the case of the liquid crystal device 100 in the OCB mode, the alignment state of the liquid crystal molecules 51 when power supply is cut off is the splay alignment shown in FIG. 5B. When power is supplied to the liquid crystal device 100, the so-called initial transition operation must be performed in which a voltage greater than or equal to a certain threshold is applied to the liquid crystal molecules 51 to change the alignment state of the liquid crystal molecules 51 from the initial splay alignment shown in FIG. 5B to the bend alignment shown in FIG. 5A for a display operation. If the initial transition is not sufficiently performed, display errors may occur, or desired high speed responsiveness may not be achieved.

Since the liquid crystal device 100 according to the first embodiment has the transition electrodes 60 which are formed in the element substrate 10 and which generate a potential difference with respect to the pixel electrodes 15, the initial transition operation of the liquid crystal layer 50 can be performed by applying a voltage between the electrodes 15 and 60.

The liquid crystal device 100 according to the first embodiment has a controller that performs driving control of a liquid crystal panel. This controller includes a common-electrode controller that controls the potential of the common electrode 23 provided in the counter substrate 20 and a pixel-electrode controller that controls the potentials of the pixel electrodes 15 via the TFTs 30. The controller may further include a transition-electrode controller that controls the potentials of the transition electrodes 60. In this way, the potentials of the transition electrodes 60 and the pixel electrodes 15 can be controlled separately, which enables detailed potential control both in the initial transition operation and the display operation.

The initial transition operation of the liquid crystal layer 50 in the liquid crystal device 100 with the foregoing structure is performed by applying a direct-current (DC) or alternating-current (AC) voltage to each transition electrode 60, thereby generating a diagonal electric field E between the transition electrode 60 and a corresponding one of the pixel electrodes 15, as shown in FIG. 4A, and allowing the electric field E including an electric field component in a substrate normal direction and an electric field component in a substrate plane direction to be applied to the liquid crystal layer 50.

Accordingly, the liquid crystal molecules 51 are tilted by the diagonal electric field E in a boundary area between the pixel electrode 15 and the transition electrode 60, and hence, a plurality of liquid crystal areas in different alignment states are formed in the liquid crystal layer 50 near the counter substrate 20. The initial transition of the liquid crystal layer 50 is generated by propagation of the boundaries of these liquid crystal areas serving as nuclei into surrounding areas. In the first embodiment, as shown in FIG. 3, the transition electrodes 60 are formed in a stripe pattern along the direction in which the data lines 6a extend. That is, each of the transition electrodes 60 is formed in a plurality of sub-pixel areas. Due to the electric field E generated between each of the pixel electrodes 15 and a corresponding one of the transition electrodes 60, the initial transition can propagate in strips from the long-side end of the pixel electrode 15. That is, the alignment transition progresses due to the bulk liquid crystal in the initial transition operation, and the initial transition progresses evenly. As shown in FIG. 3, areas in which the electric field E is generated match in direction, which is the direction in which the scanning lines 3a extend. When a voltage is applied, the liquid crystal molecules 51 can be aligned in a direction different from the initial alignment direction (indicated by arrow R in FIG. 3) of the liquid crystal.

As has been described above, since the film thickness of the dielectric film 14 sandwiched between the pixel electrode 15 and the transition electrode 60 is less than or equal to 1 μm and hence the inter-electrode distance is small, the initial transition can be induced by lower voltage. Therefore, the initial transition can progress evenly in a short period of time.

As shown in FIG. 3, since the end of each pixel electrode 15 overlaps a corresponding one of the transition electrodes 60, the electric field F is applied to the liquid crystal molecules 51 above the end of each pixel electrode 15. Thus, the liquid crystal above the end of each pixel electrode 15 is tilted in the layer-thickness direction, thereby inducing the transition of the liquid crystal molecules 51 over a wide area of each pixel electrode 15.

When displaying an image on the liquid crystal device 100, if there is a potential difference between each transition electrode 60 and the common electrode 23, the alignment of the liquid crystal molecules 51 near the boundary between each transition electrode 60 and a corresponding one of the pixel electrodes 15 may be disturbed. Therefore, when displaying an image on the liquid crystal device 100 according to the first embodiment, the potential of each transition electrode 60 and the potential of the common electrode 23 are maintained at the same voltage, thereby avoiding any errors in displaying an image.

According to the first embodiment, the direction in which the alignment films 18 and 29 are rubbed is the long-side direction of the pixel electrodes 15 (the direction in which the data lines 6a extend). However, the rubbing direction (the initial alignment direction of the liquid crystal) is not limited to direction R shown in FIG. 3.

The rubbing direction may be selected so that, when applying a voltage to each transition electrode 60 in the element substrate 10, the direction of an electric field generated between each transition electrode 60 and a corresponding one of the pixel electrodes 15 intersects with the rubbing direction (initial alignment direction). Provided that this relationship is satisfied, for example, the rubbing direction may be set to be diagonal with respect to the direction in which the data lines 6a and the scanning lines 3a extend.

As has been described above, according to the liquid crystal device 100 of the first embodiment, transition nuclei serving as starting points for the initial transition can be formed by generating an electric field between each of the pixel electrodes 15 and a corresponding one of the transition electrodes 60. Since the pixel electrode 15 is stacked above the transition electrode 60, making the film thickness of the dielectric film 14 provided between the electrodes 15 and 60 small (less than or equal to 1 μm) reduces the distance between the electrodes 15 and 16, as compared with a conventional electrode structure using a horizontal electric field. Therefore, the initial transition of the liquid crystal layer 50 can be performed using a lower voltage in a shorter period of time than before.

Second Embodiment

Figure 6A:
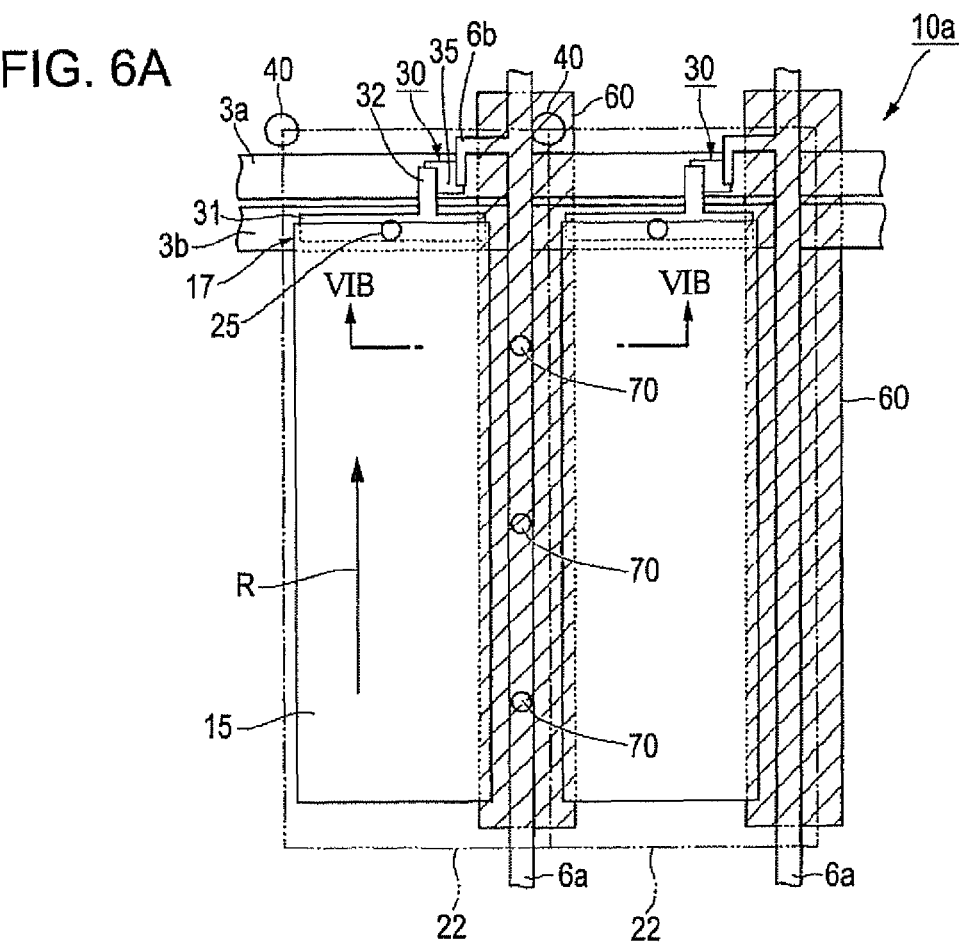
FIGS. 6A and 6B schematically illustrate the structure of a liquid crystal device according to a second embodiment.
Figure 6B:
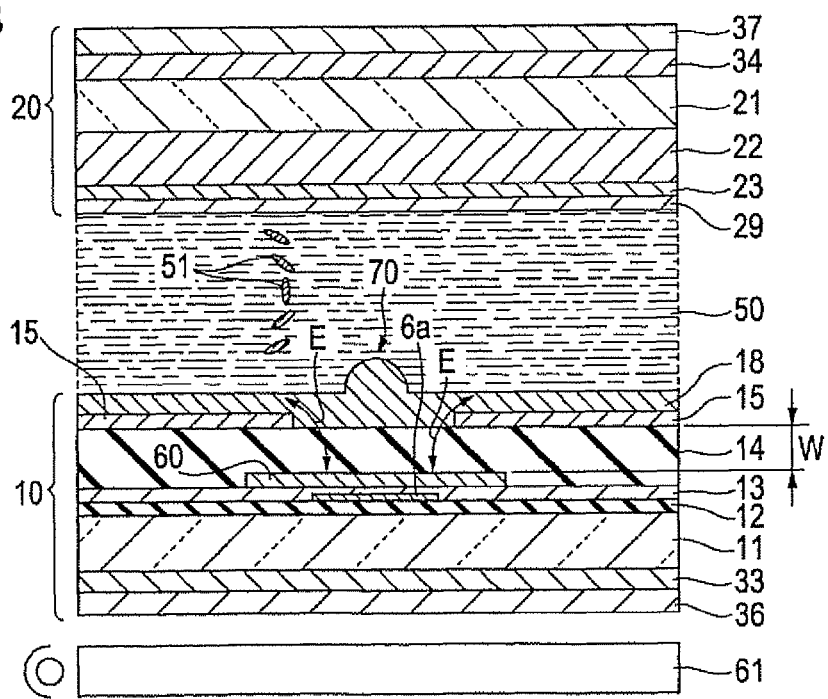

Next, a liquid crystal device according to a second embodiment of the invention will be described with reference to the drawings. FIGS. 6A and 6B schematically illustrate the structure of the liquid crystal device according to the second embodiment. FIG. 6A is a plan view of the liquid crystal device, and FIG. 6B is a sectional view of the liquid crystal device taken along the line VIB-VIB of FIG. 6A. As in the liquid crystal device 100 of the first embodiment, the liquid crystal device of the second embodiment is a TFT active-matrix transmissive-type liquid crystal device. A feature of the liquid crystal device of the second embodiment resides in protruding parts 70 provided on the element substrate 10. Since the basic structure of the liquid crystal device of the second embodiment is similar to that of the liquid crystal device of the first embodiment, the common components are referred to using the same reference numerals, and detailed descriptions thereof are omitted or only briefly given.

As shown in FIG. 6A, the liquid crystal device of the second embodiment includes a plurality of island-shaped protruding parts 70 at positions on a face of the element substrate 10 facing the liquid crystal layer 50. In plan view, the position at which each of the protruding parts 70 is provided does not overlap any of the pixel electrodes 15 (separated from the pixel electrodes 15) but overlaps a corresponding one of the transition electrodes 60. The protruding parts 70 mainly include protrusions (not shown) provided on, for example, the dielectric film 14.

The material of the protrusions may include, for example, novolac positive photoresist. The resist is developed and post-baked at approximately 220° C. to form gentle protrusions. The alignment film 18 is formed on and along the surface of these protrusions. Accordingly, the protruding parts 70 protrude from the face of the element substrate 10.

In the liquid crystal device according to the second embodiment, in plan view, the protruding parts 70 are provided at positions not overlapping any of the pixel electrodes 15 but overlapping the corresponding transition electrodes 60. As in the first embodiment, the electric field E is generated near each of the protruding parts 70.

Since the liquid crystal device according to the second embodiment has the protruding parts 70, the liquid crystal molecules 51 can be initially tilted and aligned in various directions. Further, diagonal electric fields in various directions can be generated on the surface of the protruding parts 70 by applying an initial transition voltage. Therefore, the liquid crystal molecules 51 are rotated in various directions and realigned along the electric-field direction. This generates disclination near the protruding parts 70. Accordingly, the initial alignment transition of the liquid crystal molecules 51 can be performed more smoothly.

Third Embodiment

Figure 7A:
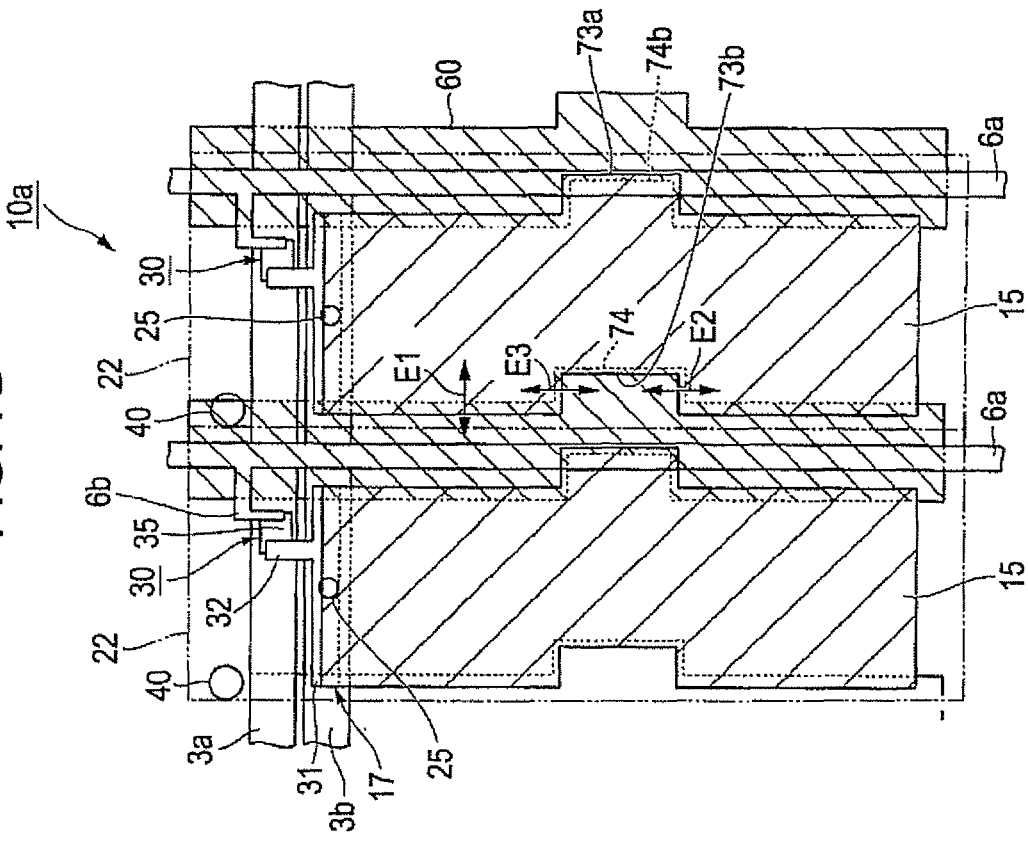
FIGS. 7A and 7B schematically illustrate the structure of a liquid crystal device according to a third embodiment.
Figure 7B:
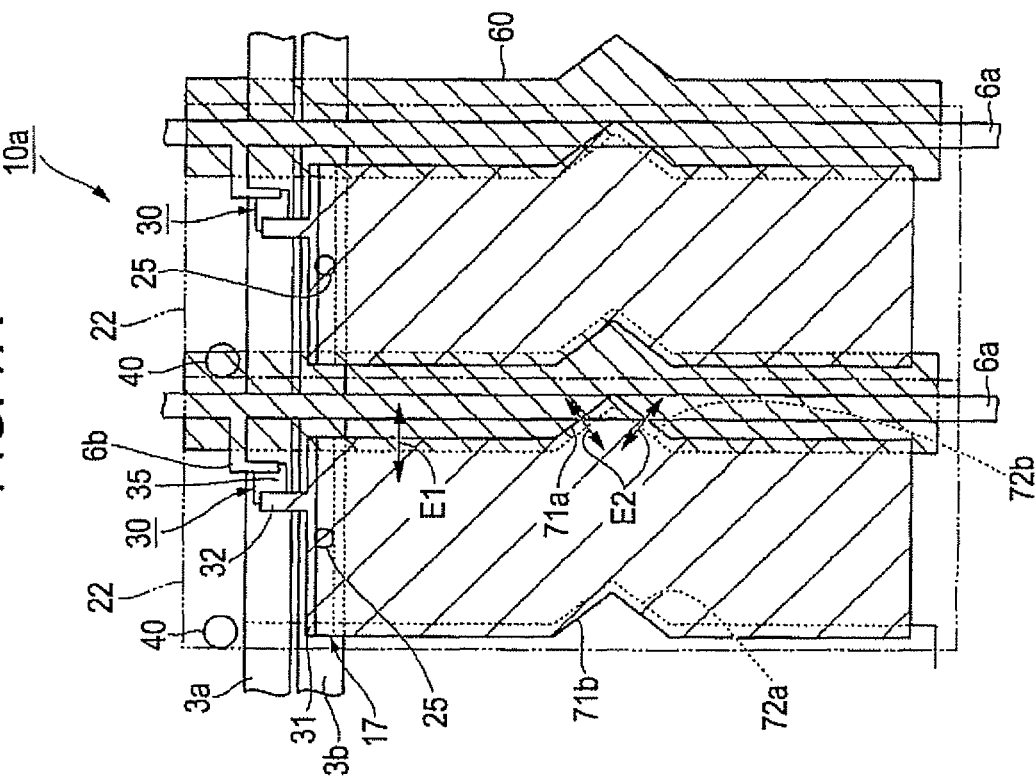

A liquid crystal device according to a third embodiment of the invention will be described with reference to the drawings. FIGS. 7A and 7B schematically illustrate the structure of the liquid crystal device according to the third embodiment. FIGS. 7A and 7B are sectional views of the liquid crystal device. As in the liquid crystal devices according to the foregoing embodiments, the liquid crystal device of the third embodiment is a TFT active-matrix transmissive-type liquid crystal device. A feature of the liquid crystal device of the third embodiment resides in the shape of each pixel electrode 15 and the shape of each transition electrode 60. Since the basic structure of the liquid crystal device of the third embodiment is similar to that of the liquid crystal devices of the foregoing embodiments, the common components are referred to using the same reference numerals, and detailed descriptions thereof are omitted or only briefly given.

In a first exemplary structure of the liquid crystal device of the third embodiment, as shown in FIG. 7A, each pixel electrode 15 and each transition electrode 60 have bent portions. Substantially central portions of the long sides of the pixel electrode 15 are partially bent. That is, each pixel electrode 15 has a protrusion (bent portion) 71a that has a triangular shape in plan view and protrudes outward in the short-side direction of the pixel electrode 15 and a recess (bent portion) 71b that retracts internally in the cross direction of the pixel electrode 15.

Each pixel electrode 15 and a corresponding one of the transition electrodes 60 overlap each other at their ends. That is, as shown in FIG. 7A, the external shape of the transition electrode 60 is formed along the external shape of the pixel electrode 15. A portion of the transition electrode 60 covering the same area as the protrusion 71a of the pixel electrode 15 is formed as a recess (bent portion) 72b that retracts internally and has a triangular shape in plan view. A portion of the transition electrode 60 covering the same area as the recess 71b of the pixel electrode 15 is formed as a protrusion (bent portion) 72a that protrudes outward and has a triangular shape in plan view.

In the initial transition operation, electric fields E2 are generated between the protrusion 71a of the pixel electrode 15 and the recess 72b of the transition electrode 60. The electric fields E2 are generated along two sides of the triangular shape and thus include electric fields in two different directions. Further, an electric field E1 in a direction perpendicular to the direction in which the transition electrode 60 extends is generated in areas where the protrusion 71a and the recess 72b are not formed. According to the liquid crystal device with the foregoing structure, electric fields in a plurality of directions are generated in the initial alignment transition. Particularly, the alignment of the liquid crystal molecules 51 is disturbed in areas where these electric fields meet one another (three points corresponding to the vertices of the triangle). Thus, transition nuclei serving as starting points for the initial transition can be successfully generated.

In the liquid crystal device with the foregoing structure according to the third embodiment, as in the foregoing embodiments, transition nuclei serving as starting points for the initial transition can be formed by generating electric fields between each of the pixel electrodes 15 and a corresponding one of the transition electrodes 60. Because of the bent portions, the electric fields are generated in a plurality of directions between the pixel electrode 15 and the transition electrode 60, thereby further ensuring the generation of transition nuclei due to the bent portions. Accordingly, the evenness of the initial transition and the high speed responsiveness can be further enhanced.

Next, a second exemplary structure of the liquid crystal device will be described. In the second exemplary structure of the liquid crystal device according to the third embodiment, as shown in FIG. 7B, as in the first exemplary structure described above, each pixel electrode 15 and each transition electrode 60 have bent portions. In the second exemplary structure, each pixel electrode 15 has a protrusion (bent portion) 73a that protrudes outward in the direction along the short side of the pixel electrode 15 and that has a rectangular shape in plan view and a recess (bent portion) 73b that retracts internally. The shape of the bent portions is different from that in the first exemplary structure.

Each pixel electrode 15 and a corresponding one of the transition electrodes 60 overlap each other at their ends. That is, as shown in FIG. 7B, the external shape of the transition electrode 60 is formed along the external shape of the pixel electrode 15. A portion of the transition electrode 60 overlapping the same area as the protrusion 73a is formed as a recess (bent portion) 74b that retracts internally and has a rectangular shape in plan view. A portion of the transition electrode 60 covering the same area as the recess 73b is formed as a protrusion (bent portion) 74a that protrudes outward and has a rectangular shape in plan view.

In the initial transition operation, electric fields are generated between each of the transition electrodes 60 and a corresponding one of the pixel electrodes 15. More specifically, as shown in FIG. 7B, an electric field E2 and an electric field E3 are generated between the protrusion 73a of the pixel electrode 15 and the recess 74b of the transition electrode 60. The electric field E2 and the electric field E3 are generated in a direction perpendicular to the short side of the rectangular shape of the bent portions. Further, an electric field E1 in a direction perpendicular to the direction in which each transition electrode 60 extends is generated in areas where the protrusion 73a and the recess 74b are not formed. An electric field in the same direction as the electric field E1 is generated in a direction perpendicular to the long axis of the rectangular shape of the bent portions. According to the liquid crystal device with the foregoing structure, the alignment of the liquid crystal molecules 51 is disturbed in areas where the electric fields in two directions meet each other (four points corresponding to the vertices of the rectangle) in the initial alignment transition. Thus, transition nuclei serving as starting points for the initial transition can be generated more successfully, as compared with the first exemplary structure described above.

In the liquid crystal device with the foregoing structure according to the third embodiment, as in the foregoing embodiments, transition nuclei serving as starting points for the initial transition can be formed by generating electric fields between each of the pixel electrodes 15 and a corresponding one of the transition electrodes 60. Because of the bent portions, the electric fields are generated in a plurality of directions between the pixel electrode 15 and the transition electrode 60, thereby further ensuring the generation of transition nuclei due to the bent portions. Accordingly, the evenness of the initial transition and the high speed responsiveness can be further enhanced.

In the third embodiment, both the pixel electrode 15 and the transition electrode 60 have bent portions. Alternatively, only one of the pixel electrode 15 and the transition electrode 60 may have bent portions. The shape of bent portions is not limited to a triangle or a rectangle in plan view, as has been described above. For example, bent portions having a zigzag shape or an accordion shape in plan view may be formed. By increasing the number of bends, positions at which the electric fields meet each other in the initial alignment transition can be increased, and transition nuclei serving as starting points for the initial transition can be more easily generated.

Fourth Embodiment

Figure 8:
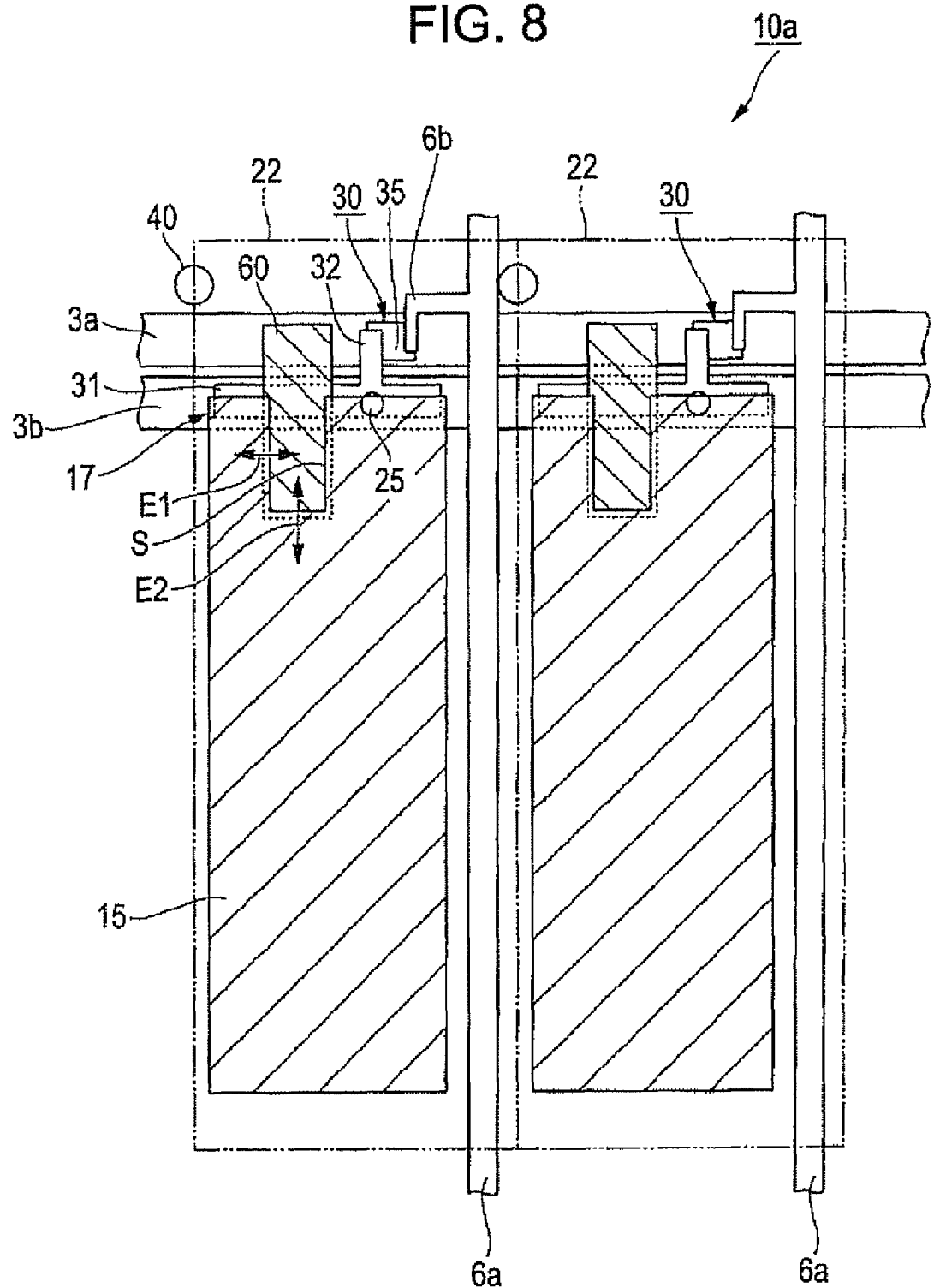
FIG. 8 is a sectional view of the schematic structure of a liquid crystal device according to a fourth embodiment.

A liquid crystal device according to a fourth embodiment of the invention will be described with reference to the drawings. FIG. 8 is a sectional view of the schematic structure of a liquid crystal device according to the fourth embodiment. The liquid crystal device of the fourth embodiment is, as in the liquid crystal devices according to the foregoing embodiments, a TFT active-matrix transmissive-type liquid crystal device. A feature of the liquid crystal device of the fourth embodiment resides in the shape of each transition electrode 60. Since the basic structure of the liquid crystal device of the fourth embodiment is similar to that of the liquid crystal devices of the foregoing embodiments, the common components are referred to using the same reference numerals, and detailed descriptions thereof are omitted or only briefly given.

As shown in FIG. 8, the liquid crystal device of the fourth embodiment includes the island-shaped transition electrodes 60. Each of the transition electrodes 60 is provided so as to overlap the same area as a slit S formed in a corresponding one of the pixel electrodes 15. The transition electrode 60 has a substantially rectangular shape and extends in the direction along the data lines 6a. The transition electrode 60 is electrically connected to a corresponding one of the scanning lines 3a via a contact hole (not shown). That is, in the liquid crystal device of the fourth embodiment, the transition electrode 60 has the same potential as that of the scanning line 3a. Alternatively, the transition electrode 60 may be directly stacked on the scanning line 3a without using a contact hole. This can be realized by directly forming the transition electrode 60 on the scanning line 3a. In this case, however, the shape of the scanning line 3a becomes complicated and the scanning line 3a will locally have a higher resistance. In contrast, as has been described above, in the case where the transition electrode 60 is separately provided above the scanning line 3a, the position and shape of the transition electrode 60 can be easily adjusted, and the degree of freedom in designing the transition electrode 60 can be increased. Accordingly, each transition electrode 60 may be provided above a corresponding one of the data lines 6a or a corresponding one of the scanning lines 3a.

The size of the slit S is smaller than the external shape of the transition electrode 60. An end of each pixel electrode 15 constituting the slit S is provided above a corresponding one of the transition electrodes 60. That is, the end of each pixel electrode 15 overlaps a corresponding one of the transition electrodes 60. Therefore, electric fields generated between the transition electrode 60 and the pixel electrode 15 in the initial alignment operation allow the liquid crystal molecules 51 above the end of the pixel electrode 15 overlapping the transition electrode 60 to be aligned.

With such a structure, the transition electrode 60 can be formed at a desired position in each pixel area, and positions at which transition nuclei serving as starting points for the initial alignment transition can be set to arbitrary positions.

The initial transition operation of the liquid crystal device according to the fourth embodiment will be described. The scanning lines 3a are turned on in a line sequential manner, and a signal is input to each of the data lines 6a, thereby applying a voltage to a corresponding one of the pixel electrodes 15. In this case, the transition electrode 60 having the same potential as the scanning line 3a has a potential difference with respect to the pixel electrode 15. As a result, electric fields are generated between the transition electrode 60 and the pixel electrode 15. More specifically, as shown in FIG. 8, electric fields including an electric field E1 orthogonal to the long-side direction of the transition electrode 60 and an electric field E2 orthogonal to the short-side direction of the transition electrode 60 are generated. According to the liquid crystal device of the fourth embodiment, the alignment of the liquid crystal molecules 51 is disturbed in areas where the electric fields generated in two directions between the pixel electrode 15 constituting the slit S and the transition electrode 60 meet each other (four positions corresponding to the vertices of the rectangle) in the initial alignment transition. Accordingly, transition nuclei serving as starting points for the initial transition can be successfully generated.

In the liquid crystal device of the fourth embodiment, as in the foregoing embodiments, transition nuclei serving as starting points for the initial transition can be formed by generating electric fields between each of the pixel electrode 15 and a corresponding one of the transition electrodes 60. Because of the electric fields generated in a plurality of directions between the transition electrode 60 overlapping the same area as the slit S formed in the pixel electrode 15 and the pixel electrode 15, the generation of transition nuclei in the initial alignment operation can be ensured.

The liquid crystal device of the invention is not limited to the foregoing embodiments, and various modifications can be made to the foregoing embodiments without departing from the spirit and scope of the invention. That is, the specific materials and structures described in the foregoing embodiments are only exemplary and can be changed as needed. For example, although the active-matrix liquid crystal devices in which TFTs (TFTs 30) are employed as switching elements have been described by way of examples in the foregoing embodiments, the invention is applicable to an active-matrix liquid crystal device in which thin film diodes are employed as switching elements.

Electronic Apparatus

Figure 9:
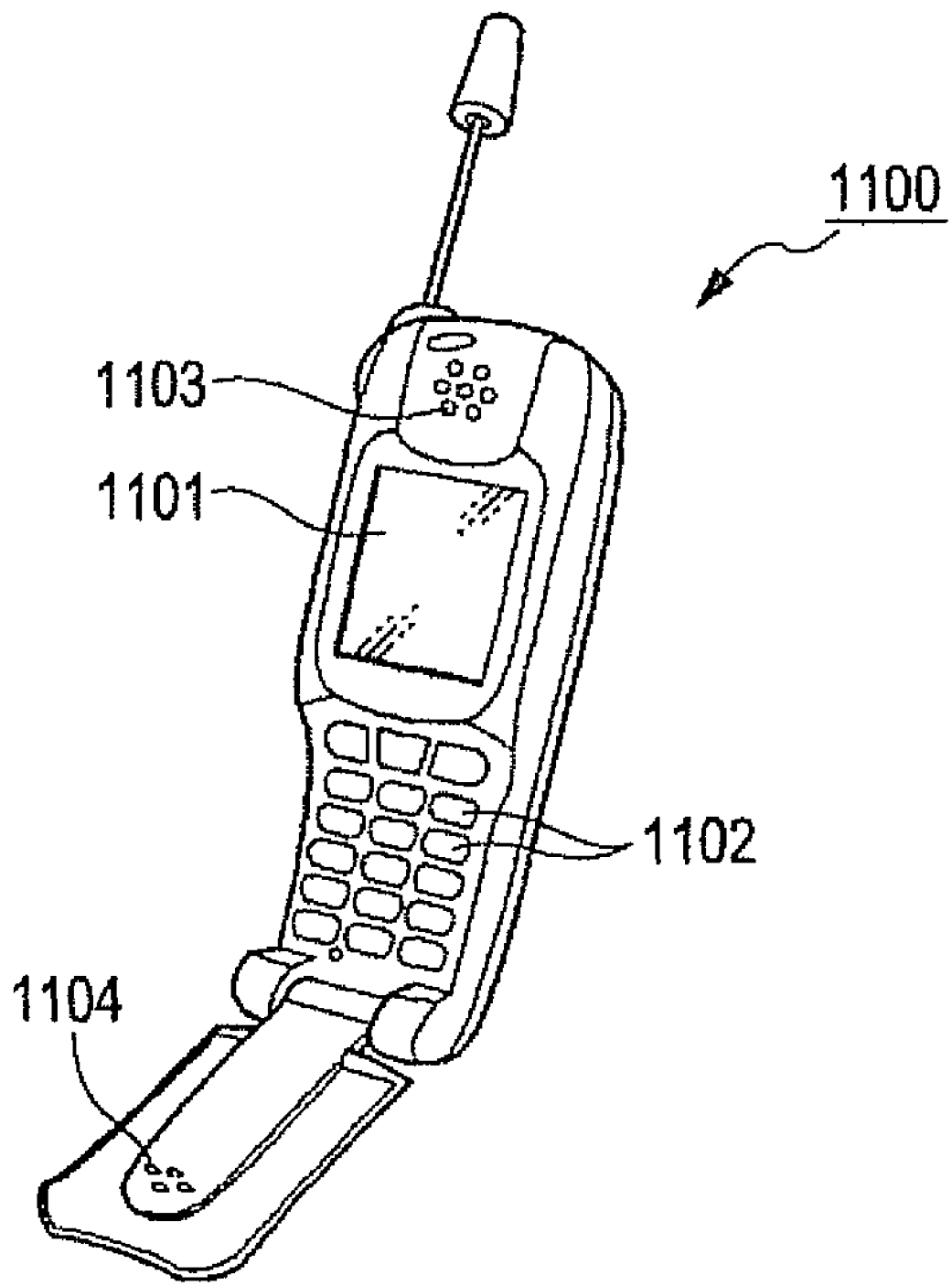
FIG. 9 is a perspective view of the schematic structure of a cellular phone serving as an exemplary electronic apparatus according to another embodiment of the invention.

FIG. 9 is a perspective view of an exemplary electronic apparatus according to an embodiment of the invention. A cellular phone 1100 shown in FIG. 9 includes the liquid crystal device according to the foregoing embodiments as a small-sized display unit 1101, a plurality of operation buttons 1102, an earpiece 1103, and a mouthpiece 1104.

Since the liquid crystal device of the foregoing embodiments can smoothly perform the initial transition operation in the OCB mode at low voltage in a short period of time, the cellular phone 1100 with an LCD unit of high display quality can be provided.

The liquid crystal device of the foregoing embodiments can be used not only as an image display unit of the foregoing electronic apparatus, but can also be used suitably as image display units of an electronic book, a personal computer, a digital still camera, a liquid crystal television, a viewfinder-type and monitor-direct-viewing video recorders, a pager, an electronic notepad, a calculator, a word processor, a workstation, a videophone, a point-of-sale (POS) terminal, and an apparatus with a touch panel. In any of these electronic apparatuses, a bright, excellent display quality with high contrast can be achieved.

What is claimed is:

1. A liquid crystal device comprising:
a first substrate;
a second substrate facing the first substrate; and
a liquid crystal layer sandwiched between the first substrate and the second substrate,
wherein the liquid crystal device is configured to perform display operation after transition of the liquid crystal layer from a splay alignment state to a bend alignment state,
wherein the first substrate includes
a plurality of scanning lines,
a plurality of data lines intersecting the plurality of scanning lines,
a plurality of pixel electrodes, and
a plurality of transition electrodes generating a potential difference with respect to the pixel electrodes, the plurality of transition electrodes being formed closer to the liquid crystal layer than the scanning lines or the data lines and closer to the first substrate than the pixel electrodes, and
wherein each of the transition electrodes has a same potential as a corresponding one of the scanning lines.

2. The liquid crystal device according to claim 1, wherein an end of each of the pixel electrodes overlaps a corresponding one of the transition electrodes.

3. The liquid crystal device according to claim 1, wherein a dielectric film is provided between each of the pixel electrodes and a corresponding one of the transition electrodes, and a portion of the dielectric film overlapping the corresponding one of the transition electrodes has a film thickness of less than or equal to 1 μM.

4. The liquid crystal device according to claim 1, wherein each of the pixel electrodes or each of the transition electrodes has a bent portion.

5. The liquid crystal device according to claim 1, wherein each of the transition electrodes is formed so as to have an island shape.

6. The liquid crystal device according to claim 1, wherein a slit formed in each of the pixel electrodes overlaps a corresponding one of the transition electrodes.

7. The liquid crystal device according to claim 1, wherein a protruding part is provided at, in plan view, a position separated from each of the pixel electrodes and overlapping a corresponding one of the transition electrodes.

8. An electronic apparatus comprising the liquid crystal device according to claim 1.

9. The liquid crystal device according to claim 1, wherein the same potential corresponds to a scanning signal.

10. The liquid crystal device according to claim 9, wherein the scanning signal has a plurality of potentials corresponding to ON and OFF signals.

11. The liquid crystal device according to claim 1, wherein the potential of each of the transition electrodes is separately controlled.

* * * * *